US012225343B2

(12) United States Patent
Zhang et al.

(10) Patent No.: US 12,225,343 B2
(45) Date of Patent: Feb. 11, 2025

(54) COAXIAL SPEAKER

(71) Applicant: AAC Microtech (Changzhou) Co., Ltd., Changzhou (CN)

(72) Inventors: Fan Zhang, Shenzhen (CN); Xin Jin, Shenzhen (CN); Wei Song, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 235 days.

(21) Appl. No.: 18/097,457

(22) Filed: Jan. 16, 2023

(65) Prior Publication Data

US 2024/0056723 A1 Feb. 15, 2024

Related U.S. Application Data

(63) Continuation of application No. PCT/CN2022/121972, filed on Sep. 28, 2022.

(30) Foreign Application Priority Data

Aug. 11, 2022 (CN) ......................... 202222114706.3

(51) Int. Cl.

| | |
|---|---|
| ***H04R 1/24*** | (2006.01) |
| ***H04R 9/02*** | (2006.01) |
| ***H04R 9/04*** | (2006.01) |
| ***H04R 9/06*** | (2006.01) |

(52) U.S. Cl.

CPC ............... *H04R 1/24* (2013.01); *H04R 9/025* (2013.01); *H04R 9/047* (2013.01); *H04R 9/063* (2013.01); *H04R 2400/11* (2013.01)

(58) Field of Classification Search

CPC . H04R 1/24; H04R 9/025; H04R 9/06; H04R 9/063; H04R 9/045; H04R 9/04; H04R 9/047; H04R 2400/11

USPC ....... 381/182, 186, 184, 412, 386, 398, 396, 381/423, 342, 401, 424, 335; 181/144, 181/148

See application file for complete search history.

(56) References Cited

U.S. PATENT DOCUMENTS

2010/0046783 A1* 2/2010 Huang ................. H04R 1/1075 381/380
2015/0350765 A1* 12/2015 David .................. H04R 1/1075 381/74

* cited by examiner

*Primary Examiner* — Norman Yu
(74) *Attorney, Agent, or Firm* — W&G Law Group

(57) ABSTRACT

Provided is speaker, including magnetic circuit unit, frame fixed to the magnetic circuit unit, and first and second sound-producing unit both fixed to the frame. The magnetic circuit unit includes magnetically conductive assembly with lower clamping plate and magnet component located on lower clamping plate. A third magnetic conductor is arranged around the magnet component, first magnetic conductor, and second magnetic conductor. A first and a second voice coil are respectively located in magnetic gaps between third magnetic conductor and second magnetic conductor and between third magnetic conductor and first magnetic conductor. The two sound-producing units share the magnetic circuit unit. The frame includes a first and a second main body portion arranged coaxially and connected to each other, a first diaphragm is fixed to second main body portion, and second diaphragm is fixed between first main body portion and second main body portion.

10 Claims, 9 Drawing Sheets

COAXIAL SPEAKER

TECHNICAL FIELD

The present disclosure relates to the technical field of speakers, and in particular, to a coaxial speaker.

BACKGROUND

In the related art, a speaker includes a tweeter and a main horn. The tweeter and the main horn are provided with a magnetic circuit and a frame that are separate and corresponding thereto. The tweeter and the main horn are mounted together through structural features, leading to higher manufacturing costs of the speaker.

Therefore, there is a need to provide a coaxial speaker to solve the problem of higher manufacturing costs of the speaker including two sound-producing units.

SUMMARY

An objective of the present disclosure is to provide a coaxial speaker.

The technical solution of the present disclosure is as follows: a coaxial speaker, the coaxial speaker includes:

a magnetic circuit unit, the magnetic circuit unit including a magnetically conductive assembly and a magnet component, wherein the magnetically conductive assembly includes a lower clamping plate, and the magnet component is located on the lower clamping plate;

a frame, the frame including a first main body portion and a second main body portion arranged coaxially, wherein the second main body portion is connected to the magnetic circuit unit, and the first main body portion is connected to the second main body portion;

a first sound-producing unit, provided with a first diaphragm, wherein the first diaphragm is connected to one side of the second main body portion away from the magnetic circuit unit; and a second sound-producing unit, including a second diaphragm, wherein the second diaphragm is located between the first main body portion and the second main body portion and connected to one side of the first main body portion away from the magnetic circuit unit and the side of the second main body portion away from the magnetic circuit unit respectively, an inner diameter of the second diaphragm is greater than an outer diameter of the first diaphragm, and a sound-producing directions of the second sound-producing unit is the same as a sound-producing direction of the first sound-producing unit is identical;

wherein the magnetically conductive assembly further includes a first magnetic conductor, a second magnetic conductor, and a third magnetic conductor, the third magnetic conductor is fixed to the lower clamping plate and extending in a direction adjacent to the second main body portion, the magnet component, the first magnetic conductor, and the second magnetic conductor are located in a space defined by the third magnetic conductor and the lower clamping plate, the magnet component includes a first magnet and a second magnet, the first magnet, the first magnetic conductor, the second magnet, and the second magnetic conductor are successively arranged in an extension direction from the lower clamping plate towards the third magnetic conductor, the third magnetic conductor forms magnetic gaps with the magnet component, the first magnetic conductor, and the second magnetic conductor respectively, the second sound-producing unit includes a second voice coil, at least part of the second voice coil is located in the magnetic gap corresponding to the first magnetic conductor, and the first sound-producing unit includes a first voice coil, at least part of the first voice coil is located in the magnetic gap corresponding to the second magnetic conductor.

As an improvement, the frame includes connectors, a plurality of the connectors are spaced apart along a circumferential direction of the second main body portion, each of the connectors has one end connected to the first main body portion and the another end connected to the second main body portion.

As an improvement, the third magnetic conductor is provided with limit slots, the limit slots extending along a height direction of the speaker and passing through the third magnetic conductor along a radial direction of the speaker; and the frame includes limit blocks, the limit blocks are arranged at interval on one side of the second main body portion away from the first main body portion, and at least part of each of the limit blocks is capable of extending into each of the limit slots.

As an improvement, the frame includes limit rings, the limit rings is connected to one end of each of the limit blocks away from the second main body portion, and at least part of the limit rings is located between the second magnet and the second magnetic conductor.

As an improvement, the second sound-producing unit includes a first suspension and a second suspension, and the second diaphragm is connected to the first main body portion through the first suspension and connected to the second main body portion through the second suspension.

As an improvement, the second sound-producing unit includes a moving member, the moving member having one side connected to the second voice coil and another side connected to one side of the second diaphragm away from the second suspension.

As an improvement, a plurality of through holes are arranged along a circumferential direction of the moving member, and at least part of each of the connectors are capable of passing through the through holes.

As an improvement, the second voice coil includes a first body portion and a second body portion, the first body portion is located in the magnetic gap corresponding to the first magnetic conductor, the second body portion is located outside the third magnetic conductor and one side of the second body portion connected to the first body portion and the other side is connected to the moving member.

As an improvement, the second body portion is provided with protruding portions extending along a direction adjacent to the first body portion, at least part of the protruding portions is capable of passing through one of the limit slots.

As an improvement, the second sound-producing unit includes a flexible substrate, the flexible substrate is connected to one side of the second body portion away from the moving member.

The present disclosure has the following beneficial effects. The first sound-producing unit and the second sound-producing unit share a magnetic circuit unit and a frame, which reduces manufacturing costs of the speaker. The frame includes a first main body portion and a second main body portion arranged coaxially and connected to each other, a first diaphragm of the first sound-producing unit is arranged on the second main body portion, and a second diaphragm of the second sound-producing unit is located between the first main body portion and the second main body portion, so that the first diaphragm and the second diaphragm produce sound in a coaxial and coplanar manner, which improves acoustic performance of the speaker.

DESCRIPTION OF EMBODIMENTS

The present disclosure is further described below with reference to the accompanying drawings and embodiments.

Figure 1:
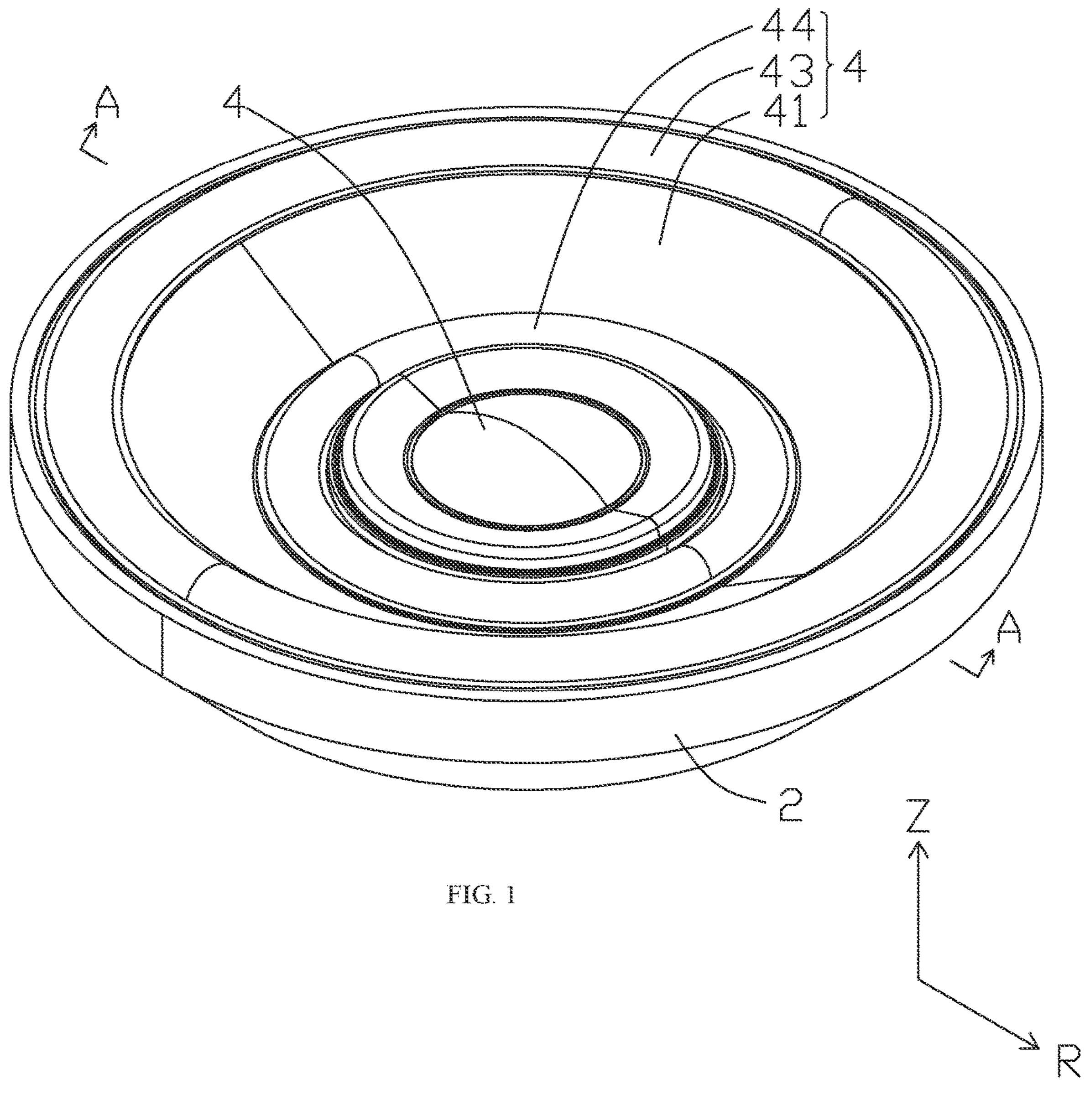
FIG. 1 is a schematic structural diagram of a speaker according to the present disclosure.
Figure 2:
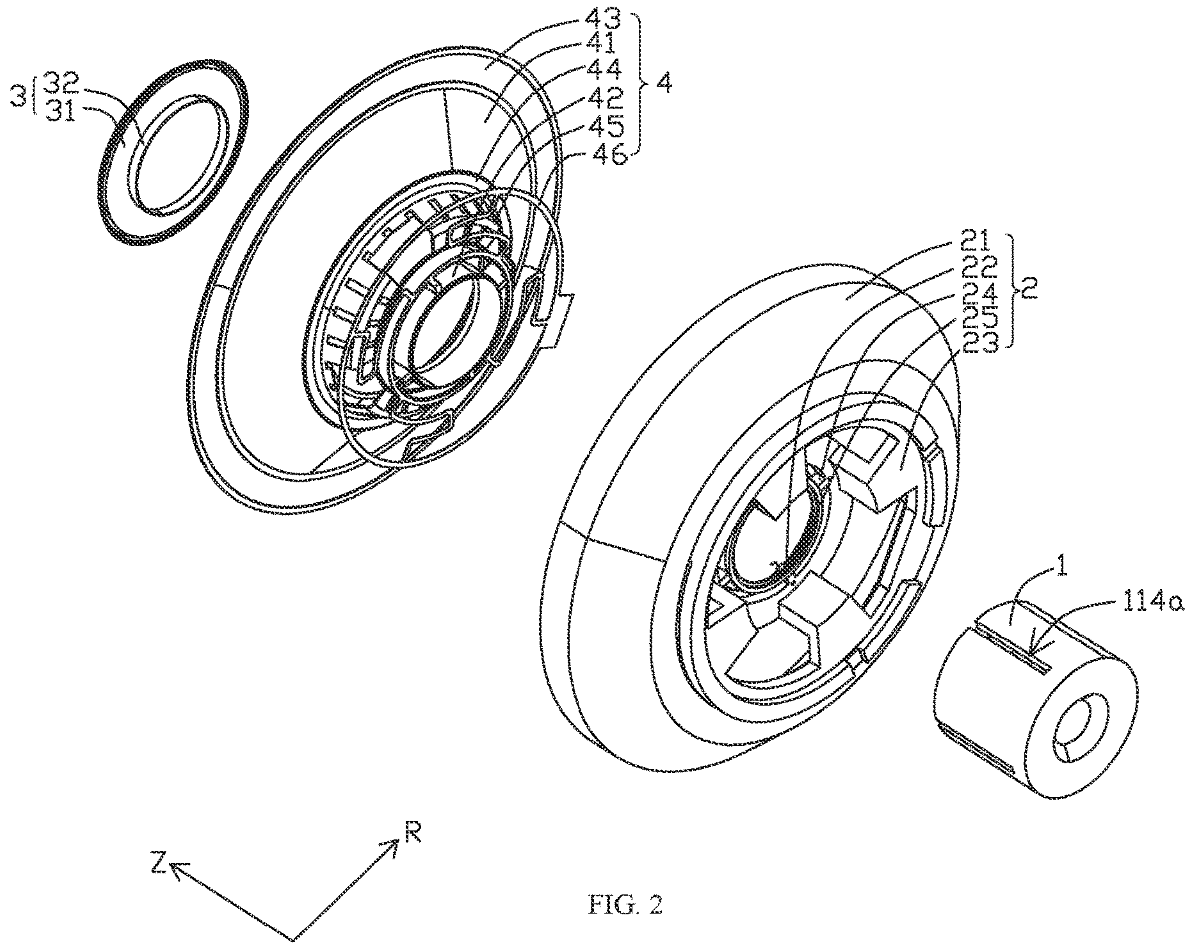
FIG. 2 is an exploded view of the speaker according to the present disclosure.
Figure 3:
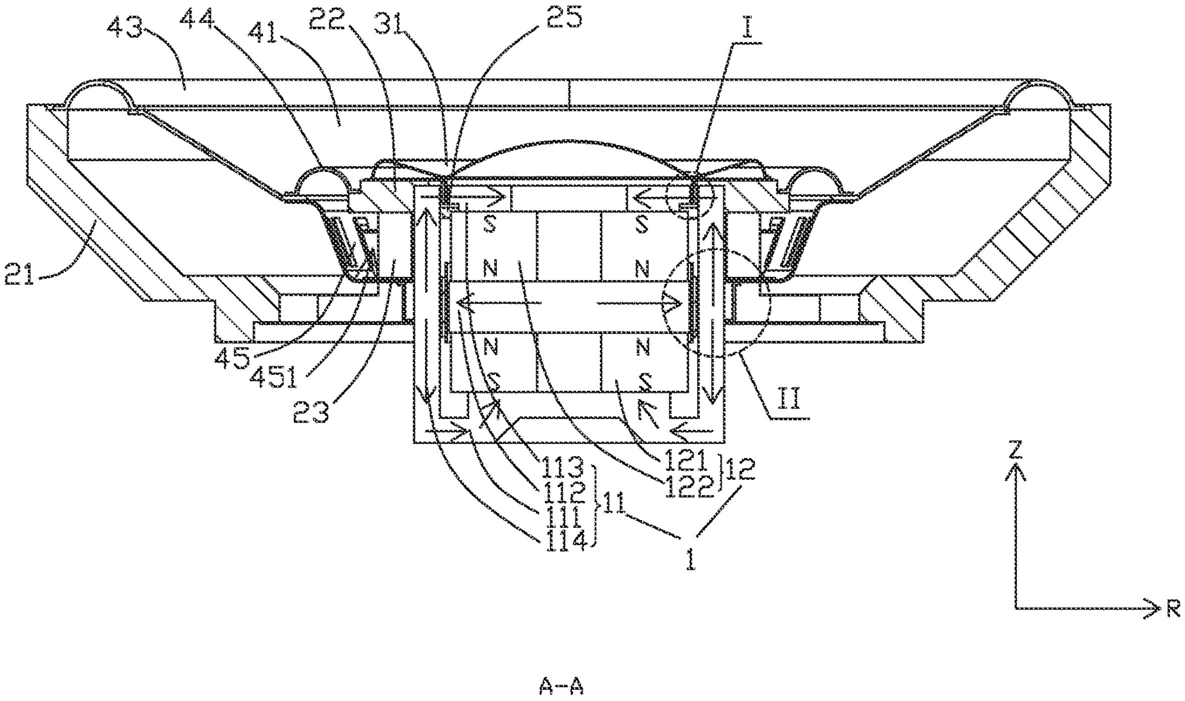
FIG. 3 is a sectional view taken along a profile line A-A in FIG. 1.

As shown in FIG. 1, FIG. 2, and FIG. 3, an embodiment of the present disclosure provides a coaxial speaker, including a magnetic circuit unit 1, a frame 2 fixed to the magnetic circuit unit 1, and a second sound-producing unit 4 and a first sound-producing unit 3 fixed to the frame 2. The magnetic circuit unit 1 includes a magnetically conductive assembly 11 and a magnet component 12. The magnetically conductive assembly 11 includes a lower clamping plate 111, and the magnet component 12 is located on the lower clamping plate 111. The magnetically conductive assembly 11 includes a first magnetic conductor 112, a second magnetic conductor 113, and a third magnetic conductor 114. The third magnetic conductor 114 is fixed to the lower clamping plate 111 and extends in a direction adjacent to the second main body portion 22. The magnet component 12 includes a first magnet 121 and a second magnet 122 arranged alternately with the first magnetic conductor 112 and the second magnetic conductor 113. In an extension direction from the lower clamping plate 111 to the third magnetic conductor 114, the first magnet 121, the first magnetic conductor 112, the second magnet 122, and the second magnetic conductor 113 are successively arranged in a space defined by the third magnetic conductor 114 and the lower clamping plate 111. The third magnetic conductor 114 forms magnetic gaps 13 with the magnet component 12, the first magnetic conductor 112, and the second magnetic conductor 113 respectively. The lower clamping plate 111 is also magnetically conductive, forming a magnetic circuit shown by an arrow in FIG. 3. The first sound-producing unit 3 includes a first voice coil 32 located in the magnetic gap 13 corresponding to the second magnetic conductor 113. The second sound-producing unit 4 includes a second voice coil 42 at least in part located in the magnetic gap 13 corresponding to the first magnetic conductor 112. The frame 2 includes a first main body portion 21 and a second main body portion 22 arranged coaxially and connected to each other. The second main body portion 22 is connected to the third magnetic conductor 114. The first sound-producing unit 3 further includes a first diaphragm 31 arranged on one side of the second main body portion 22 away from the magnetic circuit unit 1. The second sound-producing unit 4 further includes a second diaphragm 41 located between the first main body portion 21 and the second main body portion 22 and connected to one side of the first main body portion 21 away from the magnetic circuit unit 1 and the side of the second main body portion 22 away from the magnetic circuit unit 1. An inner diameter of the second diaphragm 41 is greater than an outer diameter of the first diaphragm 31.

At least part of the first voice coil 32 and the second voice coil 42 are located in a magnetic circuit formed by the magnetically conductive assembly 11 and the magnet component 12, so that the first sound-producing unit 3 and the second sound-producing unit 4 share a magnetic circuit, which reduces manufacturing costs of the speaker. The first diaphragm 31 is arranged on the second main body portion 22. The second diaphragm 41 is arranged between the first main body portion 21 and the second main body portion 22, so that the first sound-producing unit 3 and the second sound-producing unit 4 share a frame 2, which can also reduce the manufacturing costs of the speaker. The first main body portion 21 and the second main body portion 22 are arranged coaxially, so that, when a current is supplied into the first voice coil 32 and/or the second voice coil 42, the first diaphragm 31 and the second diaphragm 41 can produce sound coaxially. Both the first diaphragm 31 and the second diaphragm 41 are arranged on one side of the frame 2 away from the third magnetic conductor 114, so that sound-producing directions of the first sound-producing unit 3 and the second sound-producing unit 4 are identical, which helps to improve acoustic performance of the speaker.

Figure 4:
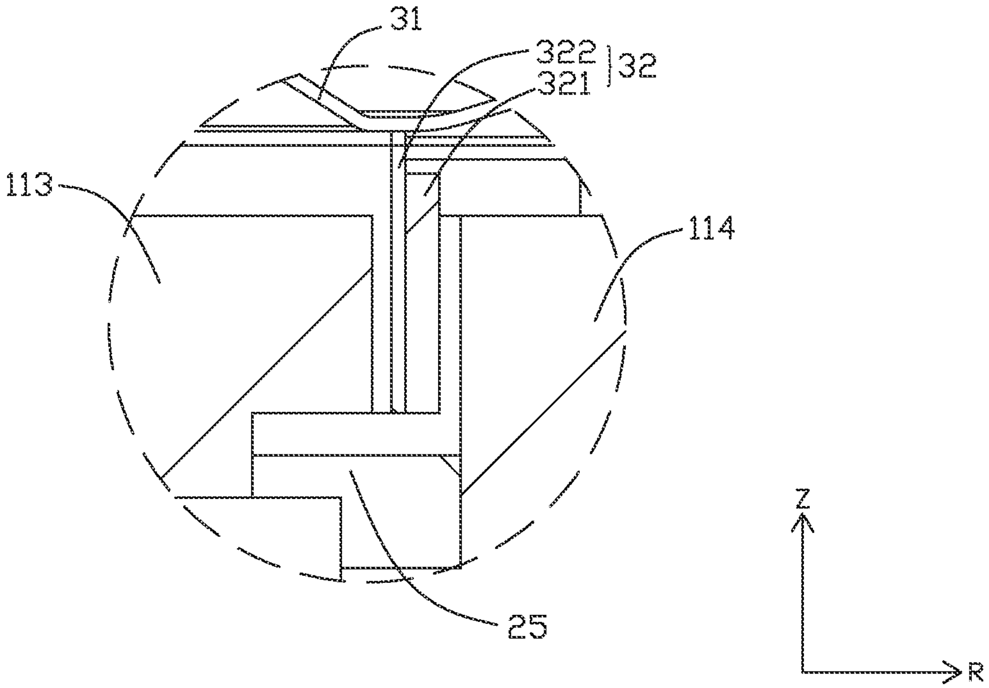
FIG. 4 is a partial enlarged view of Position I in FIG. 3.
Figure 5:
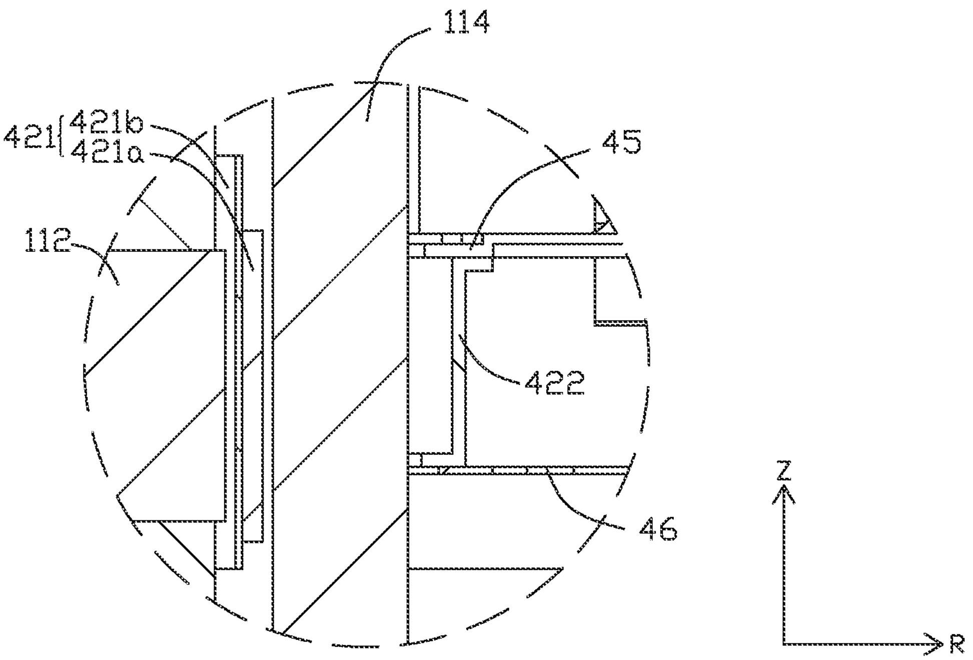
FIG. 5 is a partial enlarged view of Position II in FIG. 3.

As shown in FIG. 3 and FIG. 4, the first voice coil 32 is located in the magnetic gap corresponding to the second magnetic conductor 113, and an electrically conductive element connected to the first voice coil 32 is arranged in the frame 2 to supply a current into the first voice coil 32. After the current is supplied into the first voice coil 32, the first voice coil can move along a height direction Z of the speaker under the action of a magnetic circuit. One end of the first voice coil 32 away from an accommodating chamber 111 is connected to the first diaphragm 31 and then drives the first diaphragm 31 to move, causing the first sound-producing unit 3 to produce sound.

The first voice coil 32 includes a first coil 321 and a first coil bracket 322 connected to each other. The first coil 321 is located on one side of the first coil bracket 322 adjacent to the frame 2, so that the electrically conductive element in the frame 2 is connected to the first coil 321 and energizes the first coil 321. The first coil bracket 322 is connected to the first diaphragm 31 and drives the first diaphragm 31 to move, causing the first sound-producing unit 3 to produce sound.

As an improvement, FIG. 2 and FIG. 3 show that the third magnetic conductor 114 is provided with a plurality of limit slots **114*a* extending along the height direction Z of the speaker. The limit slots 114*a* can pass through the third magnetic conductor 114 along a radial direction of the third magnetic conductor 114. The frame 2 includes limit blocks 24 located on one side of the second main body portion 22 away from the first main body portion 21. At least part of the limit blocks 24 can extend into the limit slots 114*a***.

At least part of the limit blocks 24 can extend into the limit slots **114*a*, which can limit a relative position between the frame 2 and the third magnetic conductor 114, reduce the possibility of rotation of the frame 2 along a circumferential direction of the third magnetic conductor 114**, and help to improve stability of the speaker.

A lower surface of the second main body portion 22 is in contact with an upper surface of the third magnetic conductor 114 along the height direction Z of the speaker, which can limit the relative position between the frame 2 and the third magnetic conductor 114 and reduce the possibility of sliding of the limit blocks 24 along extension directions of the limit slots 114*a*.

As an improvement, shown in FIG. 3 and FIG. 4 show that the frame 2 includes limit rings 25 located on one end of the limit blocks 24 away from the second main body portion 22. After the frame 2 is mounted to the third magnetic conductor 114, the limit rings 25 abut against an inner wall of the third magnetic conductor 114, and are, at least in part, located between the second magnet 122 and the second magnetic conductor 113.

The limit rings 25 abut against an inner wall of the third magnetic conductor 114, which can limit the relative position between the frame 2 and the third magnetic conductor 114 along a radial direction R of the speaker and help to improve the stability of the speaker. At least part of the limit rings 25 are located between the second magnet 122 and the second magnetic conductor 113, which can limit the relative position between the frame 2 and the third magnetic conductor 114 along the height direction Z of the speaker and reduce the possibility of detachment of the frame 2 from the third magnetic conductor 114.

As an improvement, FIG. 3 shows that the second sound-producing unit 4 includes a first suspension 43 and a second suspension 44. The first suspension 43 is located on an outer side of the second diaphragm 41. The second diaphragm 41 and the first main body portion 21 are connected through the first suspension 43. The second suspension 44 is located on an inner side of the second diaphragm 41. The second diaphragm 41 is connected to the second main body portion 22 through the second suspension 44.

The first suspension 43 and the second suspension 44 are flexible materials, for example, plastics, natural rubber, and the like, which enables the second diaphragm 41 to move along an axial direction of the frame 2 and, at the same time, prevents the second diaphragm 41 from moving along a radial direction of the frame 2.

As an improvement, FIG. 3 shows that the second sound-producing unit 4 includes a moving member 45 configured to drive the second diaphragm 41 to move. The moving member 45 has one side connected to the second voice coil 42 and the other side connected to one side of the second diaphragm 41 away from the second suspension 44.

The supply of the current into the second voice coil 42 enables the second voice coil 42 to move along the height direction of the speaker. Two sides of the moving member 45 are respectively connected to the second diaphragm 41 and the second voice coil 42, which enables the second diaphragm 41 to move along with the second voice coil 42, thereby causing the second sound-producing unit 4 to produce sound.

Figure 8:
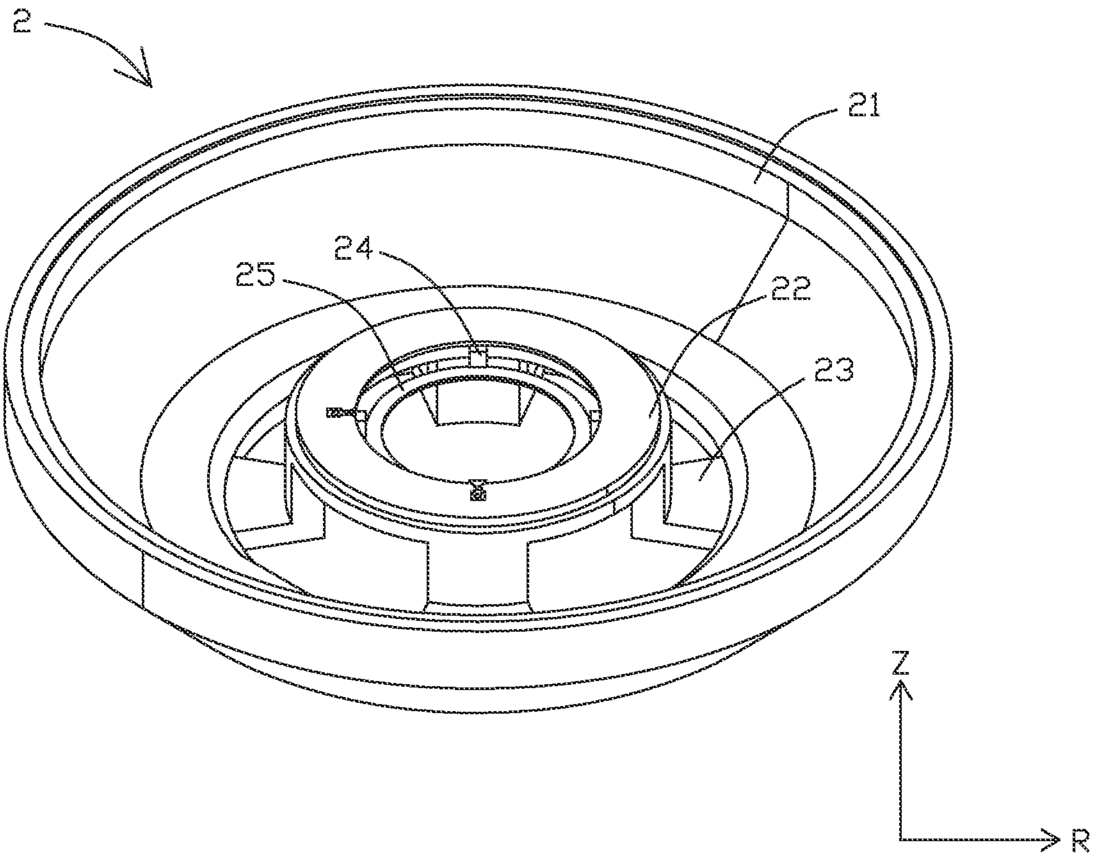
FIG. 8 is a schematic structural diagram of a frame according to the present disclosure.

As an improvement, FIG. 8 shows that the frame 2 includes a plurality of connectors 23 spaced apart along a circumferential direction of the second main body portion 22. The connectors 23 each have one end connected to the first main body portion 21 and the other end connected to the second main body portion 22.

The connectors 23 can be connected to the first main body portion 21 and the second main body portion 22. The plurality of connectors 23 are spaced apart along the circumferential direction of the second main body portion 22, which can improve strength of a connection between the first main body portion 21 and the second main body portion 22, thereby prolonging the service life of the frame 2.

As an improvement, FIG. 3 shows that a plurality of through holes 451 are arranged along a circumferential direction of the moving member 45, and the through holes 451 are arranged corresponding to the connectors 23, so that at least part of the connectors 23 can pass through the through holes 451.

At least part of the connectors 23 can pass through the through holes 451, so that, when the moving member 45 moves along with the second voice coil 42, the possibility of hindrance of the connectors 23 to the moving member 45 is reduced.

Figure 6:
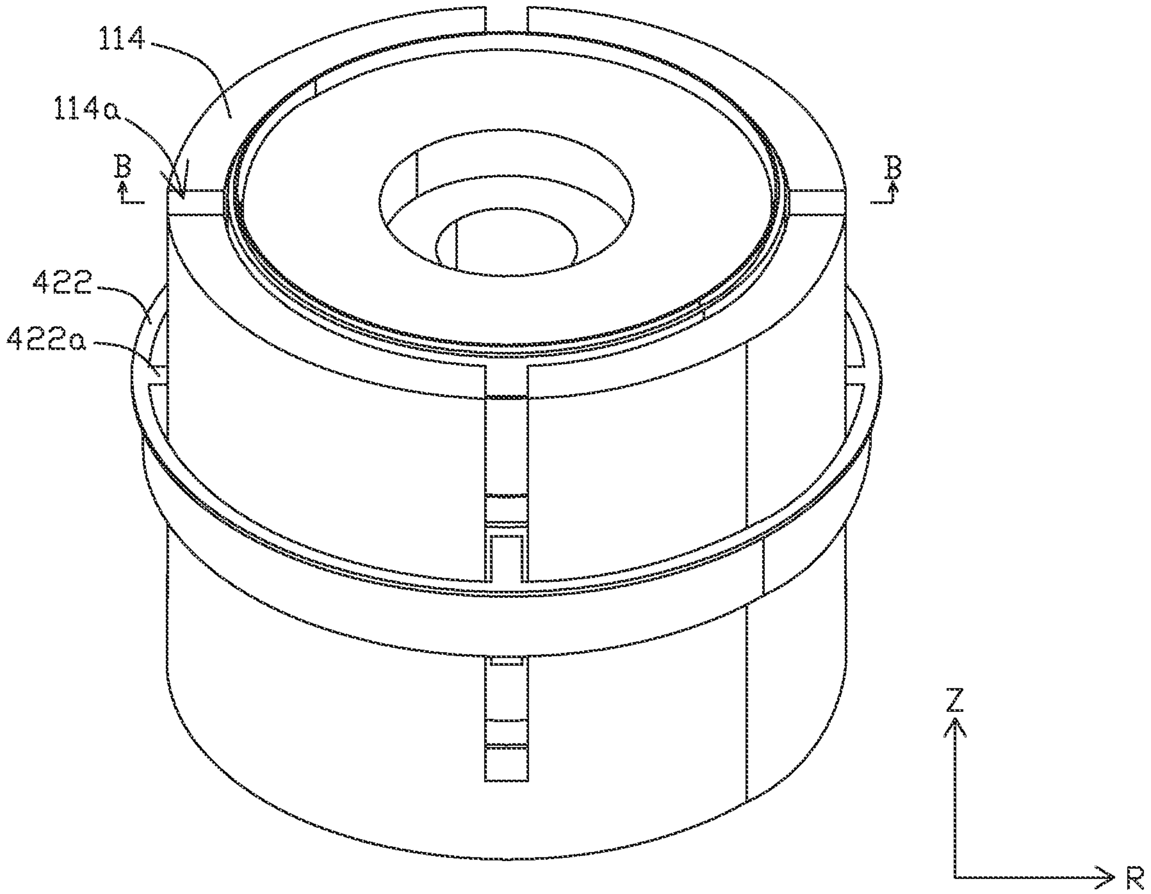
FIG. 6 is a schematic structural diagram of a magnetic circuit unit according to the present disclosure.
Figure 7:
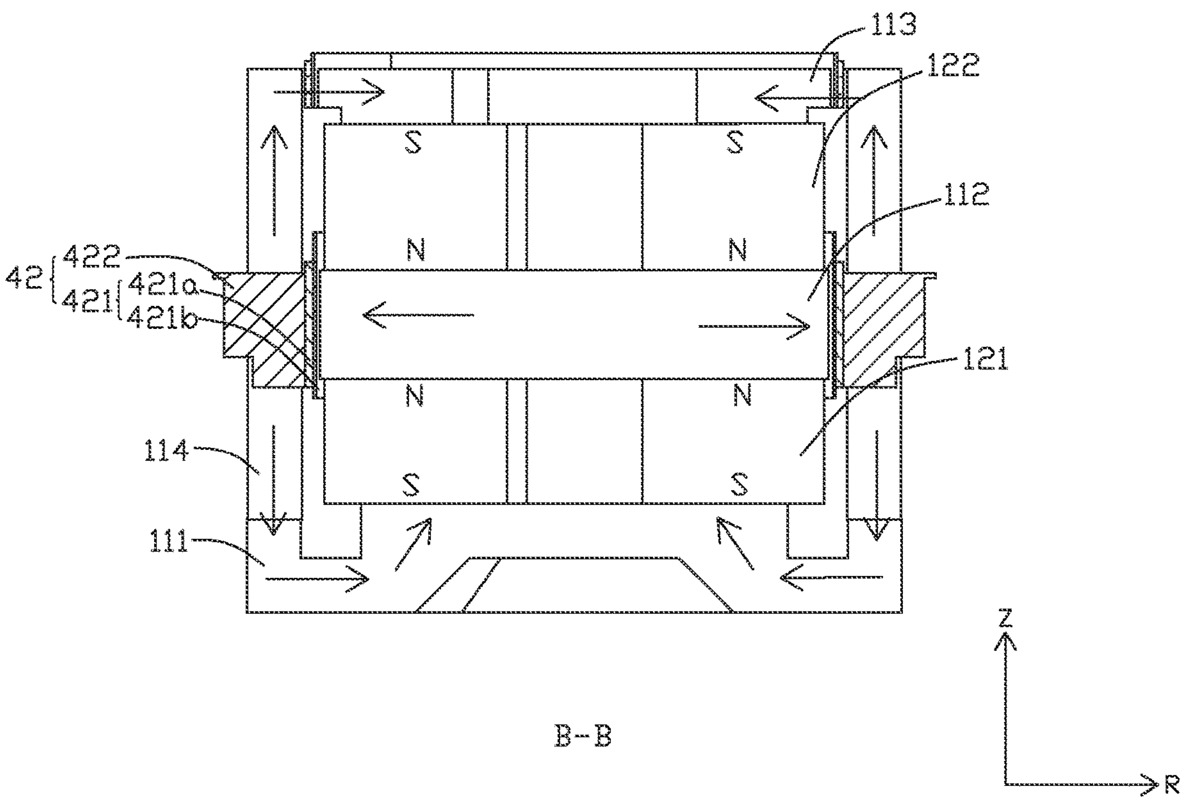
FIG. 7 is a sectional view taken along a profile line B-B in FIG. 6.

As an improvement, FIG. 6 and FIG. 7 show that, the second voice coil 42 includes a first body portion 421 and a second body portion 422 connected to each other. The first body portion 421 is located in the magnetic gap 13 corresponding to the first magnetic conductor 112. The second body portion 422 is arranged on an outer surface of the third magnetic conductor 114 along the circumferential direction of the third magnetic conductor 114 and is connected to the moving member 45.

The magnetically conductive assembly 11 and the magnet component 12 form a magnetic circuit shown by an arrow in FIG. 7. When a current is supplied into a second coil 421*a*, the first body portion 421 located in the magnetic gap 13 corresponding to the first magnetic conductor 112 can move along the height direction Z of the speaker. The second body portion 422 is connected to the first body portion 421, so that the first body portion 421 can drive the second body portion 422 to move. The second body portion 422 arranged on the outer surface of the third magnetic conductor 114 facilitates a connection with the moving member 45, and then drives the moving member 45 and the second diaphragm 41 to move, causing the second sound-producing unit 4 to produce sound.

As an improvement, FIG. 6 and FIG. 7 show that the second body portion 422 is provided with protruding portions 422*a* extending along a direction adjacent to the first body portion 421, at least part of the protruding portions 422*a* can pass through the limit slots 114*a* and move along the extension directions of the limit slots 114*a*, and the first body portion 421 and the second body portion 422 are connected through the protruding portions 422*a*.

At least part of the protruding portions 422*a* can pass through the limit slots 114*a* and move along the extension directions of the limit slots 114*a*, enabling the first body portion 421 to drive the second body portion 422 to move.

Figure 9:
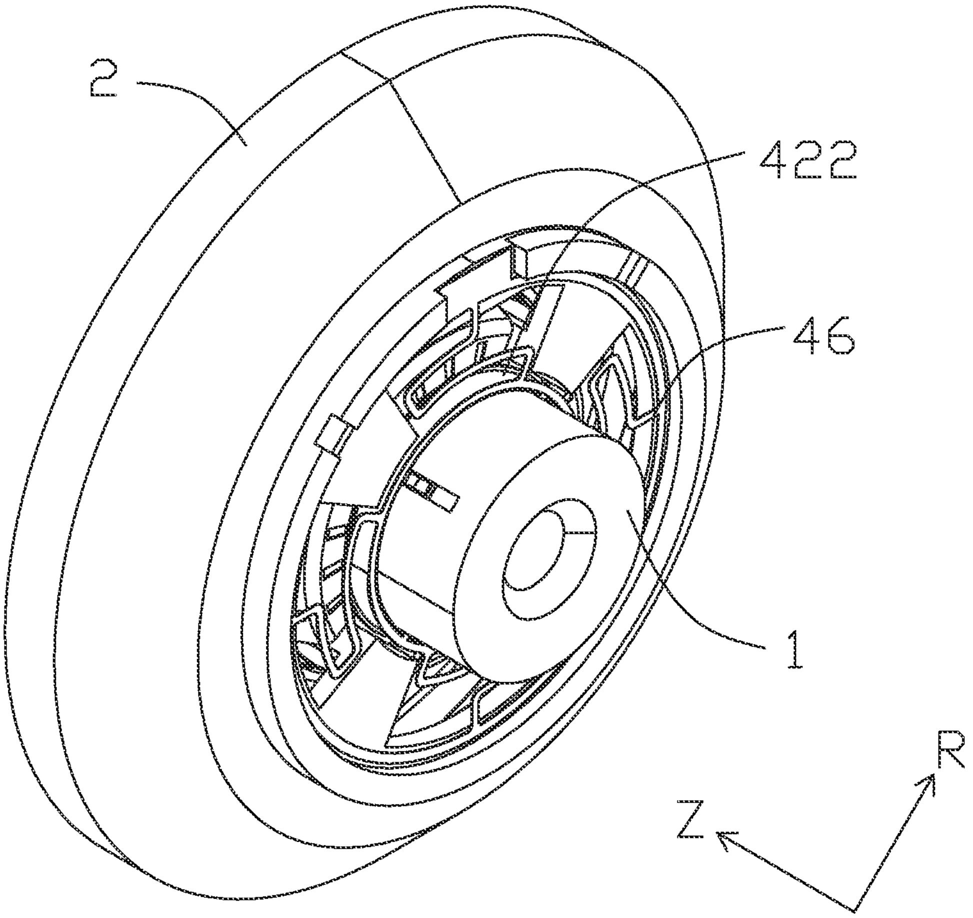
FIG. 9 is a schematic structural diagram of the speaker according to the present disclosure from another perspective.

As an improvement, FIG. 9 shows that the second sound-producing unit 4 includes a flexible substrate 46. The flexible substrate 46 has one end connected to one side of the second body portion 422 away from the moving member 45 and the other end located on one side of the frame 2 away from the second diaphragm 41.

Since the first body portion 421 is connected to the second body portion 422, the flexible substrate 46 is connected to the second body portion 422 and can supply a current into the first body portion 421 through the second body portion 422, causing the first body portion 421 to move along the height direction Z of the speaker under the action of a magnetic circuit.

The first body portion 421 includes a second coil 421*a* and a second coil bracket 421*b* connected to each other. The second coil 421*a* is connected to the second body portion 422, and the flexible substrate 46 is caused to supply a current into the second coil 421*a* through the second body portion 422. The second coil bracket 421*b* is located on one side of the second coil 421*a* adjacent to the second magnetic conductor 113.

The above descriptions are only embodiments of the present disclosure. It should be pointed out that, those of ordinary skill in the art may further make improvements without departing from the principle of the present disclosure. Such improvements should also fall within the protection scope of the present disclosure.

What is claimed is:

1. A coaxial speaker, comprising:

a magnetic circuit unit, comprising a magnetically conductive assembly and a magnet component, wherein the magnetically conductive assembly comprises a lower clamping plate, and the magnet component is located at the lower clamping plate;

a frame, comprising a first main body portion and a second main body portion that are arranged coaxially, wherein the second main body portion is connected to the magnetic circuit unit, and the first main body portion is connected to the second main body portion;

a first sound-producing unit, wherein the first sound-producing unit is provided with a first diaphragm, and the first diaphragm is connected to one side of the second main body portion away from the magnetic circuit unit;

a second sound-producing unit, comprising a second diaphragm, wherein the second diaphragm is located between the first main body portion and the second main body portion, and the second diaphragm is connected to one side of the first main body portion away from the magnetic circuit unit and the side of the second main body portion away from the magnetic circuit unit, respectively, wherein an inner diameter of the second diaphragm is greater than an outer diameter of the first diaphragm, and a sound-producing direction of the second sound-producing unit is the same as a sound-producing direction of the first sound-producing unit; and wherein the magnetically conductive assembly further comprises a first magnetic conductor, a second magnetic conductor, and a third magnetic conductor, wherein the third magnetic conductor is fixed to the lower clamping plate and extends towards the second main body portion, wherein the magnet component, the first magnetic conductor, and the second magnetic conductor are located in a space defined by the third magnetic conductor and the lower clamping plate, and wherein the magnet component comprises a first magnet and a second magnet, wherein the first magnet, the first magnetic conductor, the second magnet, and the second magnetic conductor are successively arranged in an extension direction from the lower clamping plate towards the third magnetic conductor, the third magnetic conductor forms a magnetic gap with the magnet component, the first magnetic conductor, and the second magnetic conductor, respectively, wherein the second sound-producing unit comprises a second voice coil, and at least part of the second voice coil is located in the magnetic gap corresponding to the first magnetic conductor, and wherein the first sound-producing unit comprises a first voice coil, at least part of the first voice coil is located in the magnetic gap corresponding to the second magnetic conductor.

2. The speaker as described in claim 1, wherein the frame comprises connectors spaced apart along a circumferential direction of the second main body portion, and each of the connectors has one end connected to the first main body portion and another end connected to the second main body portion.

3. The speaker as described in claim 2, wherein the third magnetic conductor is provided with limit slots extending along a height direction of the speaker and passing through the third magnetic conductor along a radial direction of the speaker; and wherein the frame comprises limit blocks arranged spaced apart from each other at one side of the second main body portion away from the first main body portion, and at least part of each of the limit blocks is capable of extending into each of the limit slots.

4. The speaker as described in claim 3, wherein the frame comprises a limit ring connected to one end of each of the limit blocks away from the second main body portion, and at least part of the limit ring is located between the second magnet and the second magnetic conductor.

5. The speaker as described in claim 3, wherein the second sound-producing unit comprises a first suspension and a second suspension, wherein the second diaphragm is connected to the first main body portion through the first suspension and connected to the second main body portion through the second suspension.

6. The speaker as described in claim 5, wherein the second sound-producing unit comprises a moving member having one side connected to the second voice coil and another one side connected to one side of the second diaphragm away from the second suspension.

7. The speaker as described in claim 6, wherein through holes are arranged along a circumferential direction of the moving member, and at least part of the connectors are capable of passing through the through holes.

8. The speaker as described in claim 7, wherein the second voice coil comprises a first body portion and a second body portion, wherein the first body portion is located in the magnetic gap corresponding to the first magnetic conductor, the second body portion is located outside the third magnetic conductor, and one side of the second body portion is connected to the first body portion and another one side of the second body portion is connected to the moving member.

9. The speaker as described in claim 8, wherein the second body portion is provided with a protruding portion extending along a direction adjacent to the first body portion, and at least part of the protruding portion is capable of passing through the limit slots.

10. The speaker as described in claim 9, wherein the second sound-producing unit comprises a flexible substrate connected to one side of the second body portion away from the moving member.

* * * * *